United States Patent [19]

Killgoar, Jr.

[11] Patent Number: 4,616,060
[45] Date of Patent: Oct. 7, 1986

[54] WINDSHIELD WIPER MATERIAL

[75] Inventor: Paul C. Killgoar, Jr., Livonia, Mich.

[73] Assignee: Ford Motor Company, Dearborn, Mich.

[21] Appl. No.: 721,488

[22] PCT Filed: Dec. 27, 1983

[86] PCT No.: PCT/US83/02033
§ 371 Date: Dec. 27, 1983
§ 102(e) Date: Dec. 27, 1983

[87] PCT Pub. No.: WO85/02856
PCT Pub. Date: Jul. 4, 1985

Related U.S. Application Data

[63] Continuation of Ser. No. 573,971, Dec. 27, 1983, abandoned.

[51] Int. Cl.$^4$ .............................. C08K 3/04; B60S 1/38
[52] U.S. Cl. .................................. 524/574; 15/250.36; 15/250.42; 524/496; 524/554; 524/581; 524/584
[58] Field of Search ............... 524/554, 581, 584, 574, 524/496; 15/250.36, 250.42

[56] References Cited

U.S. PATENT DOCUMENTS

| | | |
|---|---|---|
| 267,594 | 11/1882 | Rose . |
| 2,035,988 | 3/1936 | Seabury et al. . |
| 3,080,596 | 3/1963 | Symbolik . |
| 3,171,699 | 3/1965 | Maxey . |
| 3,384,580 | 5/1968 | Peace . |
| 4,103,385 | 8/1978 | Porter .............................. 15/250.36 |

FOREIGN PATENT DOCUMENTS 1147577  2/1968  United Kingdom .

OTHER PUBLICATIONS

Chem. Abstract 95-71934 (1981) 76JP-124078 (J8116921) Nihon Kokuen Kogyo, Apr. 20, 1981.
Chem. Abstract 95-170506g (1981) Fr. 2,469,429, May 22, 1981.
Chem. Abstract 94-85494(c) (1981) Ger. Offen. 2,923,245, Dec. 18, 1980.
Ribbed Design Makes Extrusion Possible, Rubber & Plastic News, Jan. 3, 1983, p. 3.
De-smearing Wiper Blades, Morning News, Aug. 5, 1982.

*Primary Examiner*—Herbert J. Lilling
*Attorney, Agent, or Firm*—Lorraine S. Melotik; Roger L. May

[57] ABSTRACT

This invention relates to an elastomer composition which is suitable for use as windshield wiper material. The composition comprises elastomer having a fully saturated backbone, curing agent for the elastomer in amounts sufficient to crosslink the elastomer, at least 25 weight percent particulate graphite, based on the weight of the elastomer and reinforcing particulate filler. The particulate graphite modifies the frictional properties of the elastomer. The composition has excellent weatherability and low friction and thus is ideally suitable for making windshield wiper blades.

12 Claims, No Drawings

WINDSHIELD WIPER MATERIAL

This application is a continuation of application Ser. No. 573,971, filed Dec. 27, 1983, abandoned.

TECHNICAL FIELD

This invention relates to an elastomer composition suitable for making windshield wiper blades. More particularly this invention relates to a composition comprising an elastomer having a fully saturated backbone, curing agent for the elastomer, reinforcing filler, and a high loading of graphite particulate.

BACKGROUND ART

Windshield wiper blades may be molded from a wide variety of elastomers including natural and synthetic rubbers, such as natural or synthetic polyisoprene, butadiene, ethylene-propylene-diene rubber, neoprene or blends thereof. Most generally, however, windshield wipers are made of natural or synthetic polyisoprene. In order for a windshield wiper blade to operate properly, the frictional drag of the blade across the windshield must be low. It is apparent that, if the frictional drag between the rubber and the glass can be reduced, the wiper assembly will require less power to operate. Likewise, reducing the frictional drag of the blades improves the wiping action since, as the drag increases, there is a tendency toward chattering of the blade as it is pulled over the glass. This is most commonly a problem when the windshield is only marginally wet and results in a streaked windshield during the wiping cycle. Thus, the blade must have a low degree of frictional drag in order to move over the glass with less effort and wipe the windshield more uniformly without streaks. Blades made with some elastomers, e.g., neoprene, possess a coefficient of friction which may be low enough so that no treatment to reduce the surface friction of the blade is required. However, most blade materials will require some treatment in order to reduce their surface friction.

Windshield wiper blades, typically made of polyisoprene, are generally treated by halogenating the surface of the wiper blade with either chlorine or bromine. The reaction of the halogen with the elastomer, by means of the ethylenic unsaturation present on the backbone of the elastomer, hardens the surface of the wiper blade and thus reduces its friction. It is also possible to reduce the friction of the blades by surface treatment with an inorganic acid such as nitric acid or sulfuric acid. Still another way to reduce the friction of a wiper blade is to coat the blade with a surface layer of friction reducing material, e.g., molybdenum disulfide, as is taught in U.S. Pat. No. 3,080,596.

Another attempt to form windshield wiper blades with improved wipe characteristics is described in U.S. Pat. No. 4,103,385. In that patent, the process of forming wiper blades comprises first treating the blade to harden is surface and then coating the surface hardened blade to lower its coefficient of friction, as for example, by first treating the blade with chlorine, and thereafter applying at least one coating comprising materials selected from elastomeric and plastic materials having a particular Young's modulus. It is taught therein that, where halogenation is ineffective to increase surface hardness, as in the case of blades made of ethylene-propylenediene rubber (i.e., because it is an elastomer having a saturated backbone), a first coater would apply a hardened layer on the surface of the blade, and then a second coater would apply the coating comprising the elastomeric and plastic materials.

However, while such coatings applied to windshield wipers may be effective to lower the frictional drag of the blade, the coatings may be worn off with use. Additionally, commonly employed windshield wipers, made of elastomers with unsaturated backbones such as natural rubber, are subject to chemical changes caused by environmental attack of the blade by, e.g., ultraviolet light, heat, oxygen and ozone during use. These chemical changes in the elastomer, generally by means of reactions at the unsaturated sites, change its physical properties. Consequently, the blade may stick to the windshield, losing particles when torn loose, and begins to harden and take a set so that it does not conform well to the windshield curvature. This results in a marked deterioration of the wipe characteristics of the wiper blades, necessitating their replacement.

DISCLOSURE OF THE INVENTION

This invention is directed to an improved elastomer composition suitable for use as windshield wiper material, which material has a low coefficient of friction and excellent environmental durability. The composition is characterized in that it comprises (a) 100 parts by weight of elastomer having a fully saturated backbone, (b) curing agent for the elastomer in an amount sufficient to crosslink the elastomer, (c) at least 25 parts by weight particulate graphite, and (d) reinforcing particulate filler. The composition can optionally include other materials conventional to windshield wiper compositions.

Preferably, the elastomer having a saturated backbone and used in the composition of the invention comprises or consists essentially of ethylene-propylenediene rubber (EPDM), the curing agent comprises an accelerated sulfur curing system, and the composition contains between about 50 and about 100 parts by weight particulate graphite (based on 100 parts by weight EPDM).

Advantageously, windshield wipers made from the composition taught in this application display excellent environmental degradation resistance while additionally possessing better compression set and lower friction than that of conventional blades made of natural rubber. The environmental stability of the elastomer employed in this invention results from its not possessing reactive unsaturated sites in its backbone, which sites are susceptible to environmental attack.

Another advantage of the windshield wiper blades formed from the composition of this invention is that, since the friction modifying graphite is incorporated into the composition as compared to conventionally made windshield wipers whose surface has only been treated to reduce friction, the frictional properties of the blades of this invention are not subject to change as the surface is worn off with use. Still further, the windshield wiper blade made from the composition of this invention appears to wear uniformly and thus, even with extended use, the wipers continue to provide good wiping characteristics.

BEST MODE FOR CARRYING OUT THE INVENTION

The invention of this application is directed to an elastomer composition suitable for use as windshield wiper material. Windshield wipers made from this composition display improved environmental durability and lower friction than those of conventional natural rubber blades. The composition of this invention is characterized in that it comprises elastomer having a fully saturated backbone, curing agent for the elastomer, particulate graphite and reinforcing particulate filler. Each of these components, as well as optional materials which may be included in the composition, will be discussed hereinafter in detail.

The composition of this invention comprises 100 parts by weight of elastomer having a fully saturated backbone, i.e., elastomer wherein a continuous path can be traced from one end of the elastomer polymer to the other without going through a double bond. Many such elastomers are known to one skilled in the art. Exemplary of numerous such elastomers which may be employed in the composition of this invention are ethylene-propylene-diene rubber (EPDM), commercially available as Epcar (a tradename of and available from Polysar Ltd., Sarnia, Canada), Royalene (a tradename of Uniroyal, Nanugatuck, CT.), Vistalon (a tradename of and available from Exxon, Houston, Tex.), Nordel (a tradename of an available from Dupont, Wimington, Del.), and Epsyn (a tradename of and available from Copolymer, Baton Rouge, La.). Other suitable elastomers having a saturated backbone include ethylene propylene rubber, available, e.g., as Epcar (tradename), Royalene (tradename), Vistalon (tradename), and Epsyn (tradename). Saturated nitrile elastomers which may similarly be employed include, but are not limited to Therban (a tradename of and available from Mobay Chemical, Pittsburg, Pa.). Still other elastomers having a saturated backbone comprise chlorosulfonated polyethylene, available commercially as Hypalen, (a tradename of and available from DuPont).

The elastomer employed in the composition of this invention may also be a mixture of two or more different elastomers having a saturated backbone, such as those described above. The elastomer composition of this application preferably comprises ethylene-propylenediene rubber, either in total or in part. In addition to the elastomer having a fully saturated backbone, the composition of this invention may include a minor proportion of elastomer having an unsaturated backbone, e.g., polyisoprene, as a modifying elastomer. However, in order to maintain maximum environmental durability of the blade, it is most preferable not to include any such elastomer having an unsaturated backbone in the composition.

The composition of the this application also includes curing agent for the elastomer in an amount which is sufficient to crosslink the elastomer. The selection of the particular curing agent and the optimal amount to be employed for a particular elastomer composition is dependant upon, e.g., desired physical properties, compatibility with blade forming process, as is known to those skilled in the art, and thus such selection would be within the skill of those in the art. Typically, such curing agents include, but are not limited to, sulfur systems, e.g., conventional sulfur, efficient and semi-efficient accelerated sulfur systems, peroxide curing agents, etc. Such systems are well known in the art, and are widely described in literature, e.g., "Vulcanization and Vulcanizing Agents", W. Hoffman, Maclaren and Sons Ltd., London, 1967, which is hereby expressly incorporated by reference in this application for such teachings. For the preferred embodiment EPDM elastomer, an accelerated sulfur curing system is preferred.

Graphite is incorporated into the elastomer composition in order to reduce the friction of the composition employed in forming the windshield wiper. In order to sufficiently reduce the friction to a level acceptable for wiper blades, at least about 25 parts by weight particulate graphite must be incorporated in the elastomer composition (based on 100 parts by weight of elastomer having a fully saturated backbone). In one preferred embodiment of the elastomer composition, wherein the elastomer having a fully saturated backbone comprises EPDM, the elastomer composition preferably comprises between about 50 and about 100 parts by weight of graphite particulate, per 100 parts by weight of elastomer having a fully saturated backbone. The particle size of the graphite employed in the composition of this invention is not limited to any particular particle size. Mixture of particle sizes may also be employed. More particularly, the optimal particle size to be employed in the invention composition would be suggested in part, by the method of manufacture of the blades. Selection of preferred particle size would be within the skill of those in the art. Graphite is readily commercially available as, for example, Dixon 1176 and Dixon 200-42 (Tradename of and available from The Joseph Dixon Crucible Co., Jersey City, N.J.).

Another component of the composition of this inrnvention is reinforcing particulate filler, which comprises organic or inorganic particulate, or mixtures thereof. Examples of preferred organic and inorganic particulate include carbon blacks, zinc oxide, fine particle calcium carbonates, silicas and silicates. Preferably, the reinforcing particulate comprises carbon black. Generally, reinforcing particulate levels in the composition comprise between about 15 and about 100 parts by weight, based on 100 parts by weight of the elastomer having a fully saturated backbone.

The preferred carbon blacks have an average particle size of 20–60 nm (nanometers) and are employed in the composition from about 50 to 70 parts per hundred parts of rubber. The selection of optimal type and amounts of reinforcing filler would be within the skill of one in the art.

The elastomer composition which is employed as windshield wiper material may optionally include other materials commonly employed in such formulations. These optional materials include non-reinforcing fillers such as $CaCO_3$, clay, etc.; cure activators such as stearic acid and zinc oxide; processing aids including naphthenic oils such as Circo light rubber process oil and Circosol 4240 (both available from Sun Petroleum Products, Akron, Ohio) and other additives such as dessicants like CaO. Antioxidants may be included in the composition. While it is known that, e.g., in compounding ethylene-propylene type rubbers, added antioxidants may not be required, they may be beneficial in many cases. Antioxidants include, e.g., polymerized quinolines, hindered amines, phenols and the like known in the art.

Windshield wipers are generally made by extrusion, transfer, or compression molding. A master batch of the elastomer composition is first intimately mixed together, generally in a Banbury type mixer or on two roll rubber mills, generally the curing agent being incorporated last, whereafter the composition is formed into wiper blades and cured. As is known in the art, when blades are made by extrusion, transfer molding or compression molding, the blades are made in a tandem condition, whereafter the product is slit to provide a pair of blades and the slit edges become the wiping edges of the blade when in use. The method of making the composition and forming the windshield wiper blades from the composition of this invention is not limited to any particular method. As is well known to one skilled in the art, such forming conditions as well as composition embodiment may be varied (within those claimed) to obtain wiper blades with suitable optimal characteristics.

INDUSTRIAL APPLICABILITY

It should be apparent from the foregoing that the elastomer composition of this invention finds application for use as windshield wiper material.

The following examples are presented by way of description of the composition of this invention and set forth the best mode contemplated by the inventors but are not to be construed as limiting. All amounts employed in the following examples are in parts by weight.

EXAMPLE I

Windshield wiper blades were compression molded from the following composition I:

| | |
|---|---|
| Royalene 502[1] | 100 |
| Statex M 70[2] | 119 |
| Circo light R.P.O[3] | 11 |
| ZnO | 5 |
| Stearic acid | 1 |
| Dixon 1176[4] graphice | 100 |
| 2-Mercapto benzothiazole thiazole | 1.0 |
| Tellurium diethyldithiocarbomate | 0.8 |
| Tetramethylthiuram disulfide | 0.8 |
| Dipentamathylene thiuram hexasulfide | 0.8 |
| Sulfur | 0.8 |

[1]Tradename of Uniroyal.
[2]Tradename of Cities Service Co., Columbian Div., Akron, Ohio.
[3]Available from Sun Petroleum Products.
[4]Tradename of Joseph Dixon Graphite Co.

This compound has a compression set of 14% compared to 11% for a natural rubber compound. Friction, as measured by monitoring wiper motor current, is 35% lower than for a NR (natural rubber) blade. This blade had a wipe quality of 7.5-8.0 on a scale of 1-10 (10 being excellent).

EXAMPLE II

A series of wiper blades were made from compounds having varying levels of graphite to study graphite loading on friction and wear. The compounds are:

| | II | III | IV |
|---|---|---|---|
| Epcar 585[1] | 100 | 100 | 100 |
| C-Black N-650[2] | 70 | 70 | 70 |
| ZnO | 5 | 5 | 5 |
| Stearic acid | 1 | 1 | 1 |
| Circo light R.P.O[3] | 11 | 11 | 11 |
| Circosol 4240[3] | 49 | 49 | 49 |
| Dixon 1176[4] | 75 | 50 | 25 |
| 2-Mercapto benzothiazole | 3 | 3 | 3 |
| Tetramethylthiuram disulfide | .8 | .8 | .8 |
| Tellurium diethyldithiocarbomate | .8 | .8 | .8 |
| Sulfur | .8 | .8 | .8 |
| Dipentamethylene thiuramhexasulfide | .8 | .8 | .8 |

[1]Tradename of Polysar Ltd.
[2]ASTM designation, carbon black.
[3]Tradename of Sun Petroleum Products
[4]Tradename of the Joseph Dixon Graphite Co.

It was found that, decreasing the graphite, increases friction which results in increased wear and abrasion. At 25 phr friction is comparable to or slightly greater than for a NR blade.

EXAMPLE III

Blades were made from two different compounds which employed different particle size graphite in order to study the effect of particle size on friction.

| | V | VI |
|---|---|---|
| Epcar 585[1] | 100 | 100 |
| N-347[2] | 70 | 50 |
| ZnO | 5 | 5 |
| Stearic acid | 1 | 1 |
| Circo light R.P.O[3] | 11 | 11 |
| Circosol 4240[3] | 49 | 49 |
| Dixon 1176[4] | 75 | 75 |
| Dixon 200-42[4] | | 75 |
| 2-Mercapto benzothiazole | 2.0 | 2.0 |
| Tetramethylthiuram disulfide | .8 | .8 |
| Tellurium diethyldithiocarbomate | .8 | .8 |
| Sulfur | .8 | .8 |
| Dipentamathylene thiuram hexasulfide | .8 | .8 |

[1]Tradename of Polysar Ltd.
[2]ASTM designation, carbon black.
[3]Tradename of Sun Petroleum Products.
[4]Tradename of the Joseph Dixon Graphite Co.
Windshield wiper blades made from these materials exhibited comparable frictional properties.

EXAMPLE IV

As evidence of the durability of these materials, a windshield wiper blade of compound VIII described below was made and subjected to 500,000 cycles of a durability test, during which the blade was exposed to a cycle of water spray comprising 40 seconds on and 20 seconds off. The initial wipe quality of the blade was 7.0 on a scale of 1-10 (10 being excellent) and after 1 million cycles it still had a wipe quality of 5.0.

| | VIII |
|---|---|
| Epcar 585[1] | 100 |
| N-347[2] | 50 |
| ZnO | 5 |
| Stearic acid | 1 |
| Circo light R.P.O[3] | 11 |
| Circosol 4240[4] | 49 |
| Dixon 200-42[4] | 75 |
| 2-Mercapto benzothiazole | 20 |
| Tetramethylthiuram disulfide | .8 |
| Tellurium diethyldithiocarbomate | .8 |
| Sulfur | .8 |
| Dipentamethylene thiuram hexasulfide | .8 |

[1]Tradename Polysar Ltd.
[2]ASTM designation, carbon black
[3]Tradename of Sun Petroleum Products.
[4]Tradename of The Dixon Graphite Co.

EXAMPLE V

The choice of manufacturing method may offset certain properties and suggest the optimal choice of elastomer cure system, as one skilled in the art would know. For example, if one was compression molding blades, a composition such as IX would produce blades with compression set of 14% (ASTM D-395-method B, 22 hrs. @ 70° C.). Whereas if one wanted to extrude a blade, a compound like X might be chosen which cures faster but has slightly poorer compression set of 17%. In both cases, the compression set is better than the 19-20% observed with natural rubber.

| Compound IX | |
|---|---|
| Royalene 502 (EPDM)[1] | 100 |
| Statex M-70[2] (FEF Black Oil) | 119 |
| Circo Light Process Oil[3] | 11 |
| ZnO | 5 |
| Stearic Acid | 1 |
| 2-Mercaptobenzothiazide | 1 |
| Tetramethlthiuram disulfide | 0.8 |
| Tellurium diethyldithiocarbamate | 0.8 |
| Dipentamethylene thiuram hexasulfide | 0.8 |
| Sulfur | 0.8 |
| Dixon 1176[4] graphite | 100 |

[1]Tradename of Uniroyal.
[2]Tradename of Cites Service Co.
[3]Trademark of Sun Petroleum Products.
[4]Tradename of The Dixon Graphite Co.

| Compound X | |
|---|---|
| Epcar 585 (EPDM)[1] | 100 |
| ZnO | 5 |
| Statex M-70[2] | 119 |
| Circo light R.P.O[3] | 11 |
| Stearic acid | 1 |
| Dixon 1176[4] graphite | 75 |
| 2-Mercapto benzothiazole | 3.0 |
| Tetramethylthiuram disulfide | 0.8 |
| Tellurium diethyldithiocarbomate | 0.8 |
| Dipentamathylene thiuram hexasulfide | 0.8 |
| Sulfur | 0.8 |

[1]Tradename of Polysar Ltd.
[2]Tradename Cities Service Co.
[3]Tradename of Sun Petroleum Products
[4]Tradename of The Dixon Graphite Co.

In view of the disclosure, many modifications of this invention will be apparent to those skilled in the art. It is intended that all such modifications which fall within the true scope of this invention be included within the terms of the appended claims.

I claim:

1. An elastomer composition which may be formed into windshield wiper blades and cured, characterized in that said composition comprises an intimate mixture of:
   (a) 100 parts by weight of elastomer having a fully saturated backbone;
   (b) curing agent for said elastomer in an amount sufficient to crosslink said elastomer;
   (c) at least 25 parts by weight particulate graphite; and
   (d) reinforcing particulate filler.

2. An elastomer composition according to claim 1, wherein said elastomer having a fully saturated backbone comprises ethylene-propylenediene rubber.

3. An elastomer composition according to claim 2, wherein said curing agent for said elastomer comprises an accelerated sulfur curing system.

4. An elastomer composition according to claim 2, wherein said composition comprises between about 50 and about 100 parts by weight of said particulate graphite.

5. An elastomer composition according to claim 1, wherein said reinforcing particulate comprises carbon black.

6. Windshield wiper blades made from the composition of claim 1.

7. A method for making windshield wiper blades, which method comprises:
   (A) intimately mixing together a composition comprising:
      (a) 100 parts by weight of elastomer having a fully saturated backbone;
      (b) curing agent for said elastomer in an amount sufficient to crosslink said elastomer;
      (c) at least 25 parts by weight particulate graphite; and
      (d) reinforcing particulate filler;
   (B) forming said composition into said windshield wiper blades; and
   (C) curing said composition of said windshield wiper blades.

8. A method for making windshield wiper blades according to claim 7, wherein said elastomer having a fully saturated backbone comprises ethylene-propylenediene rubber.

9. A method for making windshield wiper blades according to claim 8, wherein said curing agent for said elastomer comprises an accelerated sulfur curing system.

10. A method for making windshield wiper blades according to claim 8, wherein said composition comprises between about 50 and about 100 parts by weight of said particulate graphite.

11. A method for making windshield wiper blades according to claim 7, wherein said reinforcing particulate comprises carbon black.

12. Windshield wiper blades made according to the method of claim 7.

* * * * *